(12) United States Patent
Taymor

(10) Patent No.: US 10,282,749 B2
(45) Date of Patent: *May 7, 2019

(54) PERFORMING AN INTERACTIVE PROCESS BASED ON PROMOTIONAL INFORMATION

(71) Applicant: Comcast Cable Communications Management, LLC, Philadelphia, PA (US)

(72) Inventor: Larry Taymor, San Rafael, CA (US)

(73) Assignee: Comcast Cable Communications Management, LLC, Philadelphia, PA (US)

( * ) Notice: Subject to any disclaimer, the term of this patent is extended or adjusted under 35 U.S.C. 154(b) by 21 days.

This patent is subject to a terminal disclaimer.

(21) Appl. No.: 13/799,295

(22) Filed: Mar. 13, 2013

(65) Prior Publication Data

US 2013/0268338 A1 Oct. 10, 2013

Related U.S. Application Data

(63) Continuation of application No. 09/413,101, filed on Oct. 6, 1999, now Pat. No. 8,434,113.

(51) Int. Cl.
  *G06Q 30/00* (2012.01)
  *G06Q 30/02* (2012.01)
  *G06Q 30/06* (2012.01)

(52) U.S. Cl.
  CPC ......... *G06Q 30/0253* (2013.01); *G06Q 30/06* (2013.01)

(58) Field of Classification Search
  USPC .......................................... 405/14.23, 14.73
  See application file for complete search history.

(56) References Cited

U.S. PATENT DOCUMENTS

| 4,035,835 A | 7/1977 | Poetsch |
| 5,155,847 A | 10/1992 | Kirouac et al. |

(Continued)

OTHER PUBLICATIONS

Rosenfeld L B, et al: "Automated Filtering of Internet Postings" Online, vol. 18, No. 3, May 1994, pp. 27-30, XP000616769 see the whole document.

(Continued)

*Primary Examiner* — Yehdega Retta
(74) *Attorney, Agent, or Firm* — Banner & Witcoff, Ltd.

(57) ABSTRACT

The disclosure provides for electronic commerce using streaming media. (1) E-commerce opportunities are combined with incentives (e.g., random, pseudo-random, skill-based, or responsive to aggregate buying) for participation by recipients, enhancing the likelihood of responses from recipients and the value of distribution of the promotional information. (2) Techniques are applied to a server associated with e-commerce opportunities, to avoid unduly burdening that server. An applet may conduct the interactive process with the recipient and present results to the server, implement the incentives, conduct e-commerce transactions with the recipient, and select one or more recipients for an incentive reward. (3) The promotional material is associated with elements of the streaming media being presented, such as an actor or object. Presentation of promotional material at a device can be responsive to information about the recipient, gleaned from, for example: demographic information, preferences, fuzzy searching, or collaborative filtering.

19 Claims, 2 Drawing Sheets

(56) References Cited

U.S. PATENT DOCUMENTS

| | | | |
|---|---|---|---|
| 5,257,396 A * | 10/1993 | Auld, Jr. | H04N 7/167 348/E7.055 |
| 5,373,561 A | 12/1994 | Haber et al. | |
| 5,436,673 A | 7/1995 | Bachmann et al. | |
| 5,444,861 A | 8/1995 | Adamec et al. | |
| 5,453,779 A | 9/1995 | Dan et al. | |
| 5,495,610 A | 2/1996 | Shing et al. | |
| 5,497,422 A | 3/1996 | Tysen et al. | |
| 5,541,638 A | 7/1996 | Story | |
| 5,559,548 A | 9/1996 | Davis et al. | |
| 5,680,458 A | 10/1997 | Spelman et al. | |
| 5,724,424 A * | 3/1998 | Gifford | 705/79 |
| 5,752,042 A | 5/1998 | Cole et al. | |
| 5,754,939 A | 5/1998 | Herz et al. | |
| 5,761,306 A | 6/1998 | Lewis | |
| 5,764,992 A | 6/1998 | Kullick et al. | |
| 5,787,172 A | 7/1998 | Arnold | |
| 5,796,840 A | 8/1998 | Davis | |
| 5,796,952 A * | 8/1998 | Davis et al. | 709/224 |
| 5,808,628 A | 9/1998 | Hinson et al. | |
| 5,809,287 A | 9/1998 | Stupek, Jr. et al. | |
| 5,819,034 A * | 10/1998 | Joseph | G06Q 10/087 375/E7.024 |
| 5,850,232 A | 12/1998 | Engstrom et al. | |
| 5,859,969 A | 1/1999 | Oki et al. | |
| 5,867,166 A | 2/1999 | Myhrvold et al. | |
| 5,870,765 A | 2/1999 | Bauer et al. | |
| 5,874,967 A | 2/1999 | West et al. | |
| 5,877,741 A | 3/1999 | Chee et al. | |
| 5,903,721 A * | 5/1999 | Sixtus | G06Q 20/02 726/2 |
| 5,926,624 A | 7/1999 | Katz et al. | |
| 5,936,606 A | 8/1999 | Lie | |
| 5,943,046 A | 8/1999 | Cave et al. | |
| 5,977,960 A | 11/1999 | Nally et al. | |
| 5,983,005 A | 11/1999 | Monteiro et al. | |
| 6,002,394 A | 12/1999 | Schein et al. | |
| 6,005,574 A | 12/1999 | Herrod | |
| 6,005,602 A | 12/1999 | Matthews, III | |
| 6,006,265 A | 12/1999 | Rangan et al. | |
| 6,009,363 A | 12/1999 | Beckert et al. | |
| 6,018,768 A | 1/2000 | Ullman et al. | |
| 6,028,583 A | 2/2000 | Hamburg | |
| 6,029,045 A | 2/2000 | Picco et al. | |
| 6,029,195 A | 2/2000 | Herz | |
| 6,044,376 A | 3/2000 | Kurtzman, II | |
| 6,047,268 A * | 4/2000 | Bartoli | G06Q 20/02 705/35 |
| 6,047,269 A | 4/2000 | Biffar | |
| 6,049,628 A | 4/2000 | Chen et al. | |
| 6,049,835 A | 4/2000 | Gagnon | |
| 6,094,677 A | 7/2000 | Capek et al. | |
| 6,104,727 A | 8/2000 | Moura et al. | |
| 6,112,186 A | 8/2000 | Bergh et al. | |
| 6,131,086 A | 10/2000 | Walker et al. | |
| 6,161,142 A | 12/2000 | Wolfe et al. | |
| 6,188,398 B1 | 2/2001 | Collins-Rector et al. | |
| 6,269,343 B1 | 7/2001 | Pallakoff | |
| 6,282,713 B1 | 8/2001 | Kitsukawa et al. | |
| 6,301,586 B1 | 10/2001 | Yang et al. | |
| 6,357,042 B2 | 3/2002 | Srinivasan et al. | |
| 6,412,012 B1 | 6/2002 | Bieganski et al. | |
| 6,415,323 B1 | 7/2002 | McCanne et al. | |
| 6,438,579 B1 | 8/2002 | Hosken | |
| 6,443,840 B2 * | 9/2002 | Von Kohorn | 463/17 |
| 6,487,541 B1 | 11/2002 | Aggarwal et al. | |
| 6,615,039 B1 | 9/2003 | Eldering | |
| 6,704,930 B1 * | 3/2004 | Eldering | H04N 5/44543 348/385.1 |
| 7,124,938 B1 * | 10/2006 | Marsh | G06F 21/10 235/380 |
| 7,363,645 B1 | 4/2008 | Hendricks | |

OTHER PUBLICATIONS

Yan T W, et al: "Sift—A Tool for Wide Area Information Dissemination" Usenix Technical Conference, Jan. 16, 1995, pp. 177-186, XP000617276 see the whole document.

Bussey H E et al: "Service Architecture, Prototype Description, and Network Implications of a Personalized Information Grazing Service" Multiple Facets of Integration, San Francisco, Jun. 3-7, 1990 Institute of Electrical and Electronic Engineers, pp. 1046-1053, XP000164339 see whole document.

Wyle M F: "A Wide Area Network Information Filter" Proceedings International Conference Artificial Intelligence on Wall Street, Oct. 9, 1991, pp. 10-15, XP000534152 see the whole document.

Lang K: "NewsWeeder: learning to filter netnews" Machine Learning. Proceedings of the Twelfth International Conference on Machine Learning, Tahoe City, CA, USA, Jul. 9-12, 1995, San Francisco, CA, USA, Morgan Kaufmann Publishers, USA, pp. 331-339, XP002046557 see the whole document.

\* cited by examiner

PERFORMING AN INTERACTIVE PROCESS BASED ON PROMOTIONAL INFORMATION

CROSS-REFERENCE TO RELATED APPLICATIONS

This application is a continuation application of and claims priority to co-pending U.S. application Ser. No. 09/413,101, filed Oct. 6, 1999, having the same title. The above-mentioned application is incorporated herein by reference in its entirety.

BACKGROUND OF THE INVENTION

1. Field of the Invention

This invention relates to electronic commerce using streaming media, such as used in conjunction with a broadcast or internetworking environment.

2. Related Art

Broadcast of information and related methods (such as closed caption, community television systems, multicast, narrow-cast, or videoconferencing) allow recipients to receive streaming media, such as streaming audio or video shows, or combinations thereof. Streaming media can now be delivered to recipients using a large number of methods, including electromagnetic broadcast, network multicast, and switched system delivery.

Computer communication and computer networks allow people and businesses that are otherwise distant from each other to contact each other and exchange information. One advantageous use of computer communication is to allow commercial transactions to be conducted electronically between buyers and sellers. This form of commerce ("electronic commerce" or "e-commerce") can include advertising, catalog information, order placement, and order tracking.

One problem in the known art is how best to promote e-commerce to disparate users without using undue amounts of resources for delivery of e-commerce advertising, e-commerce offers and other e-commerce information. This problem is exacerbated with regard to goods and services that might be of interest to large numbers of customers, but for which exchange of e-commerce information does not scale well with those large numbers.

Accordingly, it would be advantageous to provide a technique for electronic commerce using streaming media, such as used in conjunction with a broadcast or internetworking environment. This advantage is achieved in embodiments of the invention in which non-obvious improvements are made. (1) E-commerce opportunities, such as promotional information, are combined with incentives for participation, thus enhancing the likelihood of responses from recipients and enhancing the value of distribution of the promotional information. (2) Techniques are applied to reduce load on an e-commerce server associated with the e-commerce opportunities, so that relatively large numbers of recipients can respond to e-commerce opportunities without unduly burdening that server. (3) E-commerce opportunities and promotional material are associated with elements of the streaming media and possibly personalized for individual recipients.

SUMMARY OF THE INVENTION

The invention provides a method and system for electronic commerce using streaming media, such as used in conjunction with a broadcast or internetworking environment.

In a first aspect of the invention, e-commerce opportunities (for example, hyperlinks or pointers to other streaming media, such as advertising or further promotional material) in streaming media are combined with incentives for participation by recipients. This enhances the likelihood of responses from recipients and enhances the value of distribution of the promotional information with the streaming media. Incentives can be random or pseudo-random, skill-based, or responsive to aggregate buying.

In a second aspect of the invention, techniques are applied to reduce load on an e-commerce server associated with the e-commerce opportunities, so that relatively large numbers of recipients can respond to e-commerce opportunities without unduly burdening that server. An applet (possibly encrypted) conducts the interactive process with the recipient and presents results to the server. The applet can implement the incentives, can conduct all or part of the e-commerce transaction with the recipient, and can operate in conjunction or in parallel with the server to select one or more recipients for an incentive reward.

In a third aspect of the invention, presentation of the e-commerce opportunities and the promotional material at the receiving device are responsive to personalized information about the recipient, gleaned from one or more of: demographic information, stated preferences, fuzzy searching, or collaborative filtering.

The invention provides an enabling technology for generalized electronic commerce using streaming media, to obtain substantial advantages and capabilities that are novel and non-obvious in view of the known art. Examples described below relate to sales of goods or services, but the invention is broadly applicable to many different types of transactions.

DETAILED DESCRIPTION OF THE PREFERRED EMBODIMENT

Figure 1:
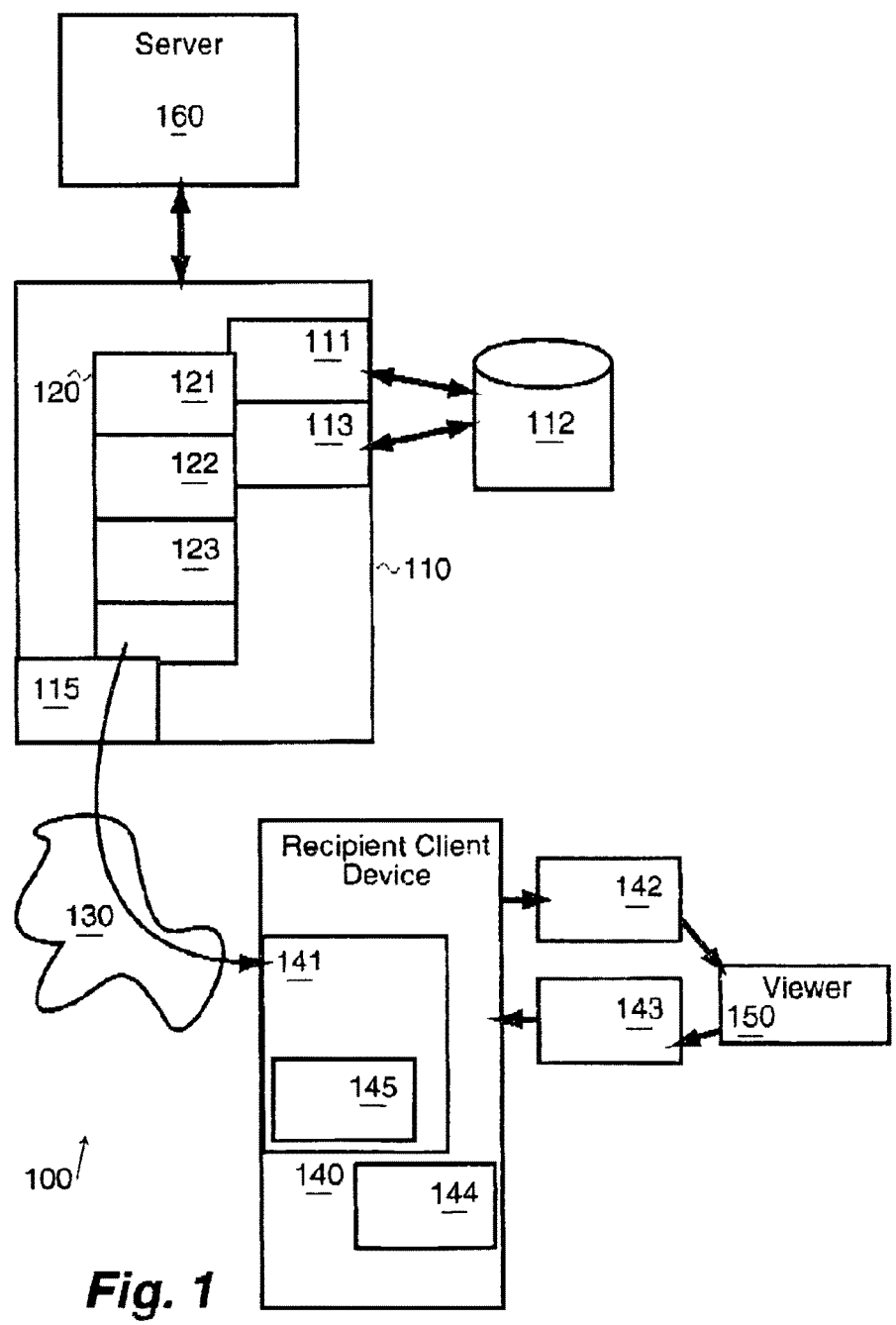
FIG. 1 shows a block diagram of a system including electronic commerce using streaming media, such as used in conjunction with a broadcast or internetworking environment.

In the following description, a preferred embodiment of the invention is described with regard to preferred process steps and data structures. Embodiments of the invention can be implemented using general purpose processors or special purpose processors operating under program control, or other circuits, adapted to particular process steps and data structures described herein. Implementation of the process steps and data structures described herein would not require undue experimentation or further invention.

As noted above, the invention provides a method and system for electronic commerce using streaming media, such as used in conjunction with a broadcast or internetworking environment.

Lexicography

As used herein, use of the following terms refer or relate to aspects of the invention as described below. The descriptions of general meanings of these terms are not intended to be limiting, only illustrative.

streaming media—in general, a time-varying sequence of data intended for presentation to a recipient For example, streaming media can include animation, audio information, motion picture or video information, still pictures in sequence, or other time-varying data. In a more general sense, streaming media can include non-visual data such as stock market information or telemetry.

element—in general, a distinguishable object (distinguishable by viewers) in a sequence of streaming media, such as a picture of a selected actor in an "action-adventure" television show e-commerce—in general, transactions conducted using a communication link or a processing device For example, e-commerce can include ordering goods or services using a communication medium such as the internet, even if delivery of those goods or performance of those services is in person. In a more general sense, e-commerce can include transactions that are wholly performed using communication, such as bank transfers, credit card transactions, or futures or stock market trading. Although most examples of e-commerce include exchange of money or other things of value, the concept of e-commerce is broad enough to include charitable activity such as donations or gifts.

promotional information—in general, information presented to a recipient to encourage or entice that recipient to participate in an e-commerce or related activity.

For example, an e-commerce opportunity or promotional information can include an advertisement, information about a product or service, an offer for sale, or a hyperlink or pointer to an advertisement, to information, or to an offer.

recipient—in general, a person (or set of people) receiving and viewing the streaming media Although the description herein is related to individuals as recipients, a recipient can be an agent for an organization, such as a business, charitable, or governmental organization.

hyperlink or pointer—in general, information leading to a data object available to the recipient In a preferred embodiment, the hyperlink or pointer can be a URL (uniform resource locator) or equivalent usage in a broadcast or interactive context.

show—in general, a defined element of streaming media, such as an episode of "Star Trek" (possibly containing subelements such as commercial breaks) or a "chat room" event e-commerce incentive—in general, an opportunity, option, or chance to receive something of value in exchange for participating in e-commerce, such as an entry into a drawing for winning a prize for making an e-commerce response e-commerce opportunity—in general, a time when a viewer can participate in e-commerce, such as a time to request further information or to purchase goods or services random or pseudo-random—in general, responsive to a process that is unpredictable to the viewer, such as a computer program random number generator skill-based—in general, responsive to a measurable ability of the viewer, such as hand-eye coordination, logical reasoning, or memory aggregate-based—in general, responsive to a statistical measure of a set of individuals, such as a highest bid or a quickest response e-commerce response—in general, an attempt by a recipient to participate in e-commerce, such as by requesting further information, purchasing goods or services, or entering a contest applet—in general, a program designed to be sent to the recipient and performed at the recipient's presentation device, such as (but not limited to) a Java applet, a Javascript program, or an executable program highlight—in general, to emphasize for additional likelihood of being noticed For example, a highlighted distinguishable object or element can be backlit, blinking, brighter or darker, florescent, shimmering, translucent, or some other effect (not necessarily visual).

and personalized information—in general, information about the recipient that is specific to that person (even if in relation to others)

For example, personalized information can include demographic information (such as the age, sex, income, home community, profession, or spending habits of the individual), stated preferences (such as interests the individual has expressed), or implied preferences (such as concluded by reference to other e-commerce opportunities or shows the recipient has participated in or received).

As described herein, the scope and spirit of the invention is not limited to the specific examples shown herein, but is intended to include the most general concepts embodied by these and other terms.

System Elements

FIG. 1 shows a block diagram of a system including electronic commerce using streaming media, such as used in conjunction with a broadcast or internetworking environment.

A system 100 includes a media distributor device 110, a streaming media data stream 120, a communication link 130, a recipient client device 140, a set of viewers 150, and an e-commerce server 160.

As used herein, the terms "distributor" and "recipient" refer to relationships between the distributor and the recipient, not necessarily to particular physical devices. In general, a distributor provides content for sending to other devices, and a recipient receives that content and presents it to a user at that location. There is no particular requirement that either the distributor or the recipient must be a single device; they may comprise portions of one device, combinations of multiple devices, or some blend thereof.

Moreover, there is no particular requirement that a distributor or a recipient must have that single role within the system 100. Thus, a distributor with regard to a first set of recipients can be a recipient with regard to a second set of distributors. For example, an intermediate distributor can take on the role of either a distributor or a recipient in the system 100.

As used herein, the terms "client" and "server" refer to relationships between the client and the server, not necessarily to particular physical devices.

As used herein, the phrase "client device" includes any device taking on the role of a client in a client-server relationship (such as an HTTP web client and web server). There is no particular requirement that any client devices must be individual physical devices; they can each be a single device, a set of cooperating devices, a portion of a device, or some combination thereof.

As used herein, the phrase "server device" includes any device taking on the role of a server in a client-server relationship. There is no particular requirement that server devices must be individual physical devices; they can each be a single device, a set of cooperating devices, a portion of a device, or some combination thereof.

There is no particular requirement that the distributor device 110 must use any particular distribution technology. In a preferred embodiment, the distributor device 110 uses either a television broadcast or a IP (internet protocol) multicast technology. However, other and further forms of distribution are usable with the invention, and are within the scope and spirit thereof. For example, the distributor device 110 can use a cable television, closed-circuit, or satellite television distribution system, an intranet, extranet, virtual private network, ATM or frame relay network, a LAN (local area network), WAN (wide area network), or some combination of any or all of these distribution technologies.

The distributor device 110 includes a substantive content element 111 for formatting and possibly storing substantive content for distribution using the streaming media data stream 120. In a preferred embodiment, the substantive content element 111 is coupled to and uses a mass storage element 112 such as a magnetic tape or optical disk for storing substantive content. However, in alternative embodiments, it may occur that the substantive content element 111 is used to generate content dynamically (such as when the content is generated by a live camera), and that intermediate storage is substantially evanescent.

The distributor device 110 includes a promotional content element 113 for formatting and possibly storing promotional content for embedding into and distribution using the streaming media data stream 120. In a preferred embodiment, the promotional content element 113 uses the mass storage element 112 for storing promotional content. However, in alternative embodiments, it may occur that the promotional content element 113 is used to generate content dynamically (such as when the content is generated by a random or pseudo-random software element), and that intermediate storage is substantially evanescent.

The distributor device 110 includes a sending element 115 for sending the streaming media data stream 120.

There is no particular requirement that the distributor device 110 must use any particular format for distribution of the streaming media data stream 120. In a preferred embodiment, the streaming media data stream 120 can include an NTSC, PAL, or SECAM television signal, or can include an MPEG, MHEG, or other audiovisual signal encoding. However, other and further other and further forms of signal encoding are usable with the invention, and are within the scope and spirit thereof. For example, the streaming media data stream 120 can include an AVI format data stream, an Apple "Quicklime" data stream, a MOV format data stream, a "RealAudio" or "RealVideo" data stream, or some combination thereof.

The streaming media data stream 120 includes a set of substantive content information 121, a set of promotional content information 122, and a set of promotional assistance information 123 embedded therein. The substantive content information 121, the promotional content information 122, and the promotional assistance information 123 are embedded in a single streaming media data stream 120.

In a first preferred embodiment, the embedding technique uses in-band broadcast techniques for the substantive content information 121 (such as a main NTSC signal) and out-of-band broadcast techniques (such as the VBI portion of the NTSC signal) for the promotional content information 122 and the promotional assistance information 123.

In a second preferred embodiment, the embedding technique uses an enhanced television standard, such as the ATVEF (Advanced Television Enhancement Forum) standard recently promulgated by the ATVEF consortium.

In alternative embodiments, the streaming media data stream 120 can include multiple channels, multiplexed data streams, or other or further techniques for distributing the substantive content information 121, the promotional content information 122, and the promotional assistance information 123 to the recipient client device 140.

The communication link 130 includes any form of distribution channel that allows the distributor device 110 to distribute the streaming media data stream 120 to the recipient client device 140. In a preferred embodiment, the communication link 130 can include a broadcast television channel portion of the electromagnetic spectrum, or an internetwork having multicast packet distribution capability (such as using IGMP or a similar multicast packet distribution protocol). However, other and further communication links, as described above with regard to other and further techniques for distribution, are usable with the invention, and are within the scope and spirit thereof.

The recipient client device 140 includes a receiving element 141, a presentation element 142, a viewer feedback element 143, and a presentation assistance element 144.

The receiving element 141 is disposed for receiving the streaming media data stream 120 and possibly recording information therein. In a preferred embodiment, the receiving element 141 can include a television signal tuner or a modem or other internet connection for receiving IP packets. In a preferred embodiment, the receiving element 141 includes at least some memory 145 for buffering at least part of the streaming media data stream 120. However, in alternative embodiments, it may occur that the receiving element 141 is used to decode content dynamically and couple that content directly to the presentation element 142, and that intermediate storage is substantially evanescent.

The presentation element 142 is disposed for presenting information to the viewer 150. In a preferred embodiment, the presentation element 142 includes a television screen or a computer monitor, and is disposed for presenting full-motion animation and video at a resolution comparable or better than known television systems.

The viewer feedback element 143 is disposed for receiving viewer feedback and decoding that feedback to determine whether the viewer 150 wishes to participate in an e-commerce opportunity.

In a preferred embodiment, the viewer feedback element 143 includes a remote-control cursor positioning device, such as used as a remote-control television controller and having buttons 146 for moving a pointer and selecting an distinguishable object or element 147 being presented by the presentation element 142.

In alternative embodiments, the viewer feedback element 143 may include a mouse or other pointing device, a biometric feedback device such as a motion detector or sound detector, or some other means by which the viewer 150 can indicate an element 147 being presented by the presentation element 142.

The presentation assistance element 144 is disposed for assisting the viewer 150 in presenting promotional content information 122 to the viewer 150 and for receiving promotional assistance information 123 for use by the recipient client device 140.

In a preferred embodiment, the recipient client device 140 includes a processor with program and data memory, and the promotional assistance information 123 includes an applet or other executable or interpretable program or program fragment for interaction with the viewer 150. For example, the promotional assistance information 123 can include a Java applet, a Javascript script, an executable program, an interactive Perl script, interactive DHTML or interactive HTML content, or some combination thereof. In a preferred embodiment, the recipient client device 140 uses the promotional assistance information 123 to interact with the viewer 150, so as to present the promotional content information 122 and to receive indications of interest, or actual product or service orders, from the viewer 150.

The set of viewers 150 includes one or more individual people, hopefully paying attention to the presentation element 142. In alternative embodiments, the viewers 150 may include communication devices or other devices for further distributing information to viewers 150, or may include artificial intelligences, programmed devices or other devices set to respond to the presentation element 142.

The e-commerce server 160 includes a processor and program and data memory, and is disposed to conduct a set of e-commerce transactions with an e-commerce client. In a preferred embodiment, the recipient client device 140 uses the presentation assistance element 144 to conduct e-commerce transactions with the e-commerce server 160.

Method of Operation

Figure 2:
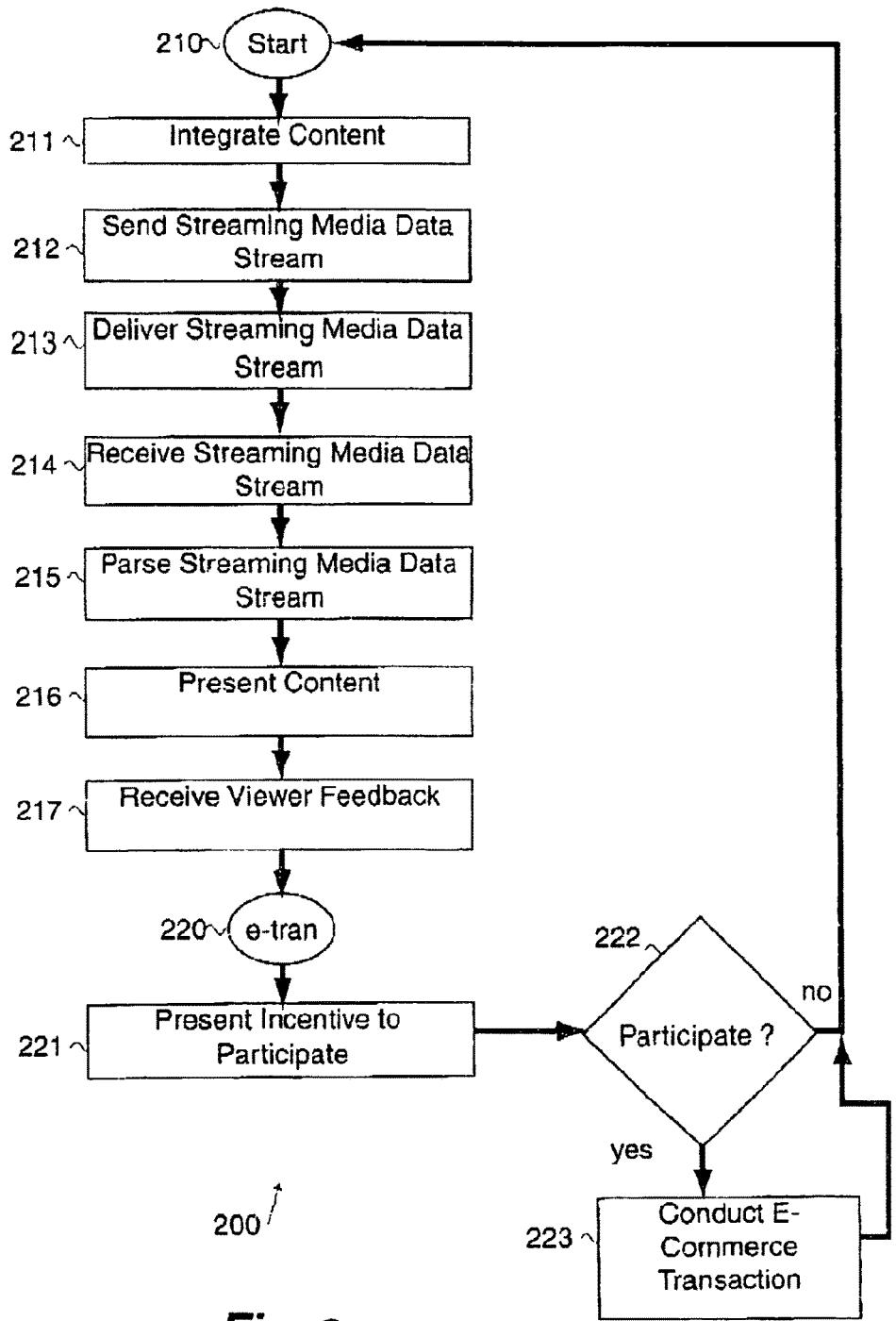
FIG. 2 shows a process flow diagram of a method for operating a system including electronic commerce using streaming media, such as used in conjunction with a broadcast or internetworking environment.

FIG. 2 shows a process flow diagram of a method for operating a system including electronic commerce using streaming media, such as used in conjunction with a broadcast or internetworking environment.

A method 200 is performed by the system 100. Although the method 200 is described serially, the steps of the method 200 can be performed by separate elements in conjunction or in parallel, whether asynchronously, in a pipelined manner, or otherwise. There is no particular requirement that the method 200 be performed in the same order in which this description lists the steps, except where so indicated.

At a flow point 210, the distributor device 110 is ready to generate the streaming media data stream 120.

At a step 211, the distributor device 110 integrates the substantive content information 121, the promotional content information 122, and the promotional assistance information 123 into the streaming media data stream 120.

At a step 212, the distributor device 110 uses the sending element 115 to send the streaming media data stream 120 to the communication link 130.

At a step 213, the communication link 130 delivers the streaming media data stream 120 to the recipient client device 140.

At a step 214, the recipient client device 140 receives the streaming media data stream 120 using the receiving element 141.

At a step 215, the receiving element 141 parses the streaming media data stream 120 to determine the substantive content information 121, the promotional content information 122, and the promotional assistance information 123. In a preferred embodiment, the substantive content information 121 includes a television show or other time-series information for presentation to the viewer 150.

At a step 216, the recipient client device 140 uses the presentation element 142 to present the substantive content information 121 to the viewer 150. In a preferred embodiment where the substantive content information 121 includes a television show, the substantive content information 121 includes a set of distinguishable object or elements 147 therein. In a preferred embodiment, these elements 147 can include individual objects in the television show, textual or graphical captions in the television show, or background scenes in the television show.

At a step 217, the recipient client device 140 uses the viewer feedback element 143 to receive feedback from the viewer 150. In a preferred embodiment where the viewer feedback element 143 includes a pointing device, the recipient client device 140 uses the presentation element 142 to present modify the presentation of the substantive content information 121 to respond to those elements 147 to which the viewer 150 points.

For example, if the viewer 150 uses the viewer feedback element 143 to point to an element 147 in the television show, the recipient client device 140 can use the presentation element 142 to perform one or more of, or some combination of, the following actions:

The presentation element 142 can highlight or otherwise emphasize the selected element 147 to indicate to the viewer 150 that the selected element 147 includes an e-commerce opportunity. For example, the presentation element 142 can highlight an actress to indicate that the viewer 150 can buy a song or movie starring that actress, or can highlight an article of clothing to indicate that the viewer 150 can buy a copy thereof.

The presentation element 142 can alter the presentation, such as by including at least some of the promotional content information 122 in the presentation. For example, the presentation element 142 can present a textual description of the e-commerce opportunity in a caption or other region of a display screen.

and

The presentation element 142 can use the promotional assistance information 123 to initiate an e-commerce transaction, if selected by the viewer 150. For example, if the viewer 150 can selects an element 147 that is highlighted, and use the viewer feedback element 143 to assent with a "YES" or "BUY THIS" button 146. The presentation element 142 would use the promotional assistance information 123 to perform an applet or other script to conduct an e-commerce transaction.

The recipient client device 140 uses the presentation assistance element 144 to assist the viewer 150 with participating in the e-commerce opportunity.

In a preferred embodiment, the recipient client device 140 uses personalization information about the viewer 150 to determine which, if any, e-commerce opportunities or promotional material to present to the viewer 150. The personalization information can include one or more of, or some combination of, the following:

Demographic information, such as the viewer's age, sex, viewing location, home address, work address, occupation, annual income, or assets.

Stated preferences, such as subjects or products the viewer 150 has stated they are interested in, or implied they are interested in by making purchases.

and

Fuzzy searching or collaborative filtering, such as subjects or products the viewer 150 might be interested in by reference to those other products the viewer 150 has purchased or the television show the viewer 150 is watching.

The method 200 proceeds with the flow point 220.

E-Commerce Incentives

At a flow point 220, the viewer 150 is ready to possibly participate in a selected e-commerce transaction.

At a step 221, the recipient client device 140 uses the presentation element 142 to present an incentive for participating in the selected e-commerce transaction. As part of this step, the recipient client device 140 uses at least some of the promotional content information 122 to present to the viewer 150 the nature of the incentive.

As noted herein, the nature of the incentive can be one or more of, or some combination of, the following:

The incentive can be a random or pseudo-random incentive. For example, the viewer 150 can be informed that all those persons who make a purchase within the next 15 minutes will be entered into a drawing for a new car. Similarly, the viewer 150 can be informed that, of all those persons who make a purchase within the next 15 minutes, one will receive a 50% discount on price.

In a preferred embodiment, the random or pseudo-random e-commerce incentive includes one or more of the following:

(a) The Nth person to engage in the e-commerce opportunity (similar to the $31^{st}$ caller or the $14^{th}$ caller to call into a radio show) is given a price discount. The price discount might be that the product is free of charge, or that a prize is awarded to that one person.

(b) The first N persons to engage in the e-commerce opportunity (similar to the first 41 callers to call into a radio show) are each given a similar price discount.

(c) A randomly selected person (similar to a randomly selected person to call into a radio show) is given a similar price discount. The randomly selected person can be chosen from the pool of persons who engage in the e-commerce opportunity within a set period of time, or selected from all such persons.

The incentive can be a skill-based incentive. For example, the viewer 150 can be challenged to conduct a test of skill (such as answering a trivia question, performing a test of hand-eye coordination, demonstrating accuracy or speed, or conducting a strategy game), in conjunction with making a purchase. Those viewers 150 who are successful at the test of skill would be given a monetary reward, such as a free product or service, a price discount, or a cash prize.

In a preferred embodiment, the skill-based e-commerce incentive includes one or more of the following:

(a) If a question, the question can be one of: a question about the product, a question about the show on which the product or service is advertised, a question about the advertisement itself.

(b) If a test of hand-eye coordination, the test can be a video game or similar test.

(c) If a strategy cgame, the test can be a simple strategy game, such as tic-tac-toe, or a more complex strategy game, such as chess.

and

The incentive can be an aggregate buying incentive. For example, the viewer 150 can be informed that the price of the product or service is responsive to the number of viewers 150 making a purchase in the next 15 minutes, where a larger number of viewers 150 doing so provides a lower price to each.

In a preferred embodiment, the aggregate buying e-commerce incentive includes one or more of the following:

(a) A price discount proportional to the aggregate price savings if a relatively larger number of viewers 150 buy the product.

(b) A price discount to all viewers if the number of viewers 150 buying the product exceeds a selected threshold. For example, if at least 10,000 viewers 150 buy the product, all of them get a discount; if fewer do, none get a discount.

As noted above, the incentive can be a blend or combination of these types of incentives. For example, the viewer 150 can be informed that (a) the first 500 purchasers will receive a price discount or an additional prize, (b) that some selected purchaser, such as the $314^{th}$ purchaser, will receive the product for free, or (c) some related incentive.

At a step 222, the viewer 150 determines whether to participate in the selected e-commerce transaction. If the viewer 150 determines not to participate, the method 200 continues with the flow point 210. If the viewer 150 determines to participate, the method 200 continues with the next step.

At a step 223, the recipient client device 140 uses the presentation assistance element 144 to conduct the e-commerce transaction with the viewer 150. In a preferred embodiment, the presentation assistance element 144 can be encrypted or the viewer 150 can otherwise be restricted from unfettered access, so the viewer 150 cannot easily spoof the presentation assistance element 144 into giving away an undeserved incentive. The presenation assistance element 144 gleans information necessary for the e-commerce transaction from the viewer 150 (such as selected product, quantity, method of payment, delivery location, and the like), and conducts the portion of the e-commerce transaction involving the incentive.

As part of this step, the operation of the presentation assistance element 144 depends on the nature of the incentive. In general, the presentation assistance element 144 can generate a random or pseudo-random value, or can engage the viewer 150 in a test of skill, using only information local to the recipient client device 140. However, some blended or combination incentives, or incentives responsive to aggregates, involve coordination between the presentation assistance element 144 and the e-commerce server 160.

Where the presentation assistance element 144 and the e-commerce server 160 coordinate, the presentation assistance element 144 gleans as much information from the viewer 150 as possible, so as to send that information to the e-commerce server 160 without a protracted exchange of protocol messages.

Thus for example, if the incentive is that the $314^{th}$ purchaser receives the product for free, the presentation assistance element 144 at each recipient client device 140 would determine a time-stamp for the purchase, and would send that information to the e-commerce server 160 (possibly later or with a staggered time delay). The e-commerce server 160 would receive the individual data and determine a single winner for the incentive. The e-commerce server 160 would inform the presentation assistance element 144 for the winning viewer 150 to that effect, which would in turn inform the winning viewer 150.

In a preferred embodiment, the e-commerce server 160 would broadcast to all presentation assistance elements 144 an identifier for each winning viewer 150, along with an indicator whether the incentive is still open. If the incentive is no longer open (for example, the $314^{th}$ purchase has already been made), each presentation assistance element 144 would have sufficient information to determine whether it should burden the e-commerce server 160 with any further requests for incentive determination.

Whether or not the viewer 150 won the incentive, the presentation assistance element 144 sends information for the e-commerce transaction to the e-commerce server 160. In a preferred embodiment, this information is sent later or with a staggered time delay, so as to reduce instantaneous burden on the e-commerce server 160.

Generality of the Invention

The invention has general applicability to various fields of use, not necessarily related to sales of goods or services as described above. Other and further applications of the invention in its most general form, would be clear to those skilled in the art after perusal of this application, and are within the scope and spirit of the invention.

ALTERNATIVE EMBODIMENTS

Although preferred embodiments are disclosed herein, many variations are possible which remain within the concept, scope, and spirit of the invention, and these variations would become clear to those skilled in the art after perusal of this application.

What is claimed is:

1. A method comprising:
   receiving, by a device via a network, data having three or more embedded components, wherein a first of the three or more embedded components comprises media content, wherein a second of the three or more embedded components comprises promotional information associated with the media content, and wherein a third of the three or more embedded components comprises executable instructions configured to, when executed by the device, cause the device to perform an interactive process with a user;
   determining, by the device, based on demographic information associated with the user, to present the promotional information;
   outputting, by the device, a presentation of the promotional information; and
   executing, by the device and based on a user selection associated with the promotional information, the executable instructions to cause the device to perform the interactive process, which comprises:
      receiving, by the device, input representing one or more user interactions, wherein the one or more user interactions are associated with the promotional information,
      determining, by the device, a time-stamp associated with the interactive process; and
      sending, by the device to a computing device via the network, the time-stamp and results related to the one or more user interactions.

2. The method of claim 1, wherein the executable instructions comprise an executable program.

3. The method of claim 1, wherein determining, by the device, the time-stamp associated with the interactive process comprises determining, by the device, a purchase time-stamp for a purchase of additional media content that is performed during the interactive process, and
   wherein the time-stamp comprises the purchase time-stamp, and wherein the method further comprises:
      after sending the time-stamp and the results, receiving, by the device via the network, an indication of whether the additional media content was purchased for free.

4. The method of claim 1, wherein the interactive process comprises outputting a presentation of an incentive to purchase additional media content.

5. The method of claim 1, wherein the interactive process is performed without receiving from or sending to the computing device prior to the sending of the time-stamp and the results.

6. The method of claim 1, wherein an in-band portion of a National Television Committee (NTSC) signal comprises the media content, and wherein an out-of-band portion of the NTSC signal comprises the promotional information and the executable instructions.

7. The method of claim 6, wherein the out-of-band portion comprises a Vertical Blanking Interval (VBI) portion of the NTSC signal, and wherein the VBI portion comprises the executable instructions.

8. The method of claim 1, wherein the three or more embedded components conform to an enhanced television standard.

9. The method of claim 8, wherein the three or more embedded components conform to an Advanced Television Enhancement Forum (ATVEF) standard.

10. A method comprising:
    receiving, by a device via a network, data having three or more embedded components, wherein a first of the three or more embedded components comprises media content, wherein a second of the three or more embedded components comprises promotional information associated with the media content, and wherein a third of the three or more embedded components comprises interpretable instructions configured to cause the device to perform an interactive process with a user;
    determining, by the device, based on demographic information associated with the user, to present the promotional information;
    outputting, by the device, a presentation of the promotional information; and
    using, by the device and based on a user selection associated with the promotional information, the interpretable instructions to cause the device to perform the interactive process, which comprises:
       receiving, by the device, input representing one or more user interactions, wherein the one or more user interactions are associated with the promotional information,
       determining, by the device, a time-stamp associated with the interactive process; and
       sending, by the device to a computing device via the network, the time-stamp and results related to the one or more user interactions.

11. The method of claim 10, wherein the interactive process is performed without receiving from or sending to the computing device prior to the sending of the time-stamp and the results.

12. The method of claim 10, wherein the interpretable instructions comprise a JAVA applet.

13. The method of claim 10, wherein the interpretable instructions comprise a JAVASCRIPT script.

14. The method of claim 10, wherein the interpretable instructions comprise a PERL script.

15. The method of claim 10, wherein the interpretable instructions comprise HyperText Markup Language (HTML) content.

16. The method of claim 10, wherein the interpretable instructions comprise Dynamic Hyper Text Markup Language (DHTML) content.

17. A method comprising:
    receiving, by a device via a network, an Internet Protocol (IP) multicast having three or more data components, wherein a first of the three or more data components comprises media content, wherein a second of the three or more data components comprises promotional information, and wherein a third of the three or more data components comprises executable instructions configured to, when executed by the device, cause the device to perform an interactive process with a user;

determining, by the device, based on demographic information associated with the user, to present the promotional information;

outputting, by the device, a presentation of the promotional information; and executing, by the device and based on a user selection associated with the promotional information, the executable instructions to cause the device perform the interactive process, which comprises:

receiving, by the device, input representing one or more user interactions, wherein the one or more user interactions are associated with the promotional information;

determining, by the device, a time-stamp associated with the interactive process; and sending, by the device to a computing device via the network, the time-stamp and results related to the one or more user interactions.

18. The method of claim 17, wherein the interactive process is performed without receiving from or sending to the computing device prior to the sending of the time-stamp and the results.

19. The method of claim 17, wherein the executable instructions comprise an executable program.

* * * * *